United States Patent
Kim

(10) Patent No.: US 9,457,637 B2
(45) Date of Patent: Oct. 4, 2016

(54) CRASH PAD UPPER MOUNTING BRACKET

(71) Applicant: HYUNDAI MOBIS CO., LTD., Seoul (KR)

(72) Inventor: Young Jun Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 124 days.

(21) Appl. No.: 14/229,109

(22) Filed: Mar. 28, 2014

(65) Prior Publication Data

US 2015/0028167 A1 Jan. 29, 2015

(30) Foreign Application Priority Data

Jul. 23, 2013 (KR) .................. 10-2013-0086633

(51) Int. Cl.
*B60H 1/00* (2006.01)
(52) U.S. Cl.
CPC . *B60H 1/00535* (2013.01); *B60H 2001/00635* (2013.01)
(58) Field of Classification Search
USPC .................. 248/49, 65; 280/727, 751, 752
See application file for complete search history.

(56) References Cited

U.S. PATENT DOCUMENTS

| | | | | |
|---|---|---|---|---|
| 3,724,357 A | * | 4/1973 | Kavthekar | B60H 1/0055 454/127 |
| 6,783,173 B2 | * | 8/2004 | Nakamura | B60H 1/0055 296/208 |
| 7,731,261 B2 | * | 6/2010 | Wenzel | B29C 45/006 180/90 |
| 2002/0024236 A1 | | 2/2002 | Scheib et al. | |
| 2002/0043819 A1 | * | 4/2002 | Lee | B60R 21/04 296/192 |
| 2002/0060475 A1 | * | 5/2002 | Kim | B62D 21/15 296/192 |
| 2007/0057498 A1 | * | 3/2007 | Koh | B60R 21/205 280/743.1 |
| 2010/0200320 A1 | * | 8/2010 | Lehmann | B60R 13/0838 180/68.3 |

FOREIGN PATENT DOCUMENTS

KR 10-0633410 B1 10/2006

OTHER PUBLICATIONS

Chinese Office Action issued Mar. 23, 2016 in counterpart Chinese Application No. CN 201410147424.0 (7 pages, in Chinese).

* cited by examiner

*Primary Examiner* — Steven Marsh
(74) *Attorney, Agent, or Firm* — NSIP Law

(57) ABSTRACT

The present invention relates to a crash pad upper mounting bracket which is installed between an HVAC (heating, ventilation and air conditioning) to which a connecting duct of a vehicle is connected, and a crash pad, the crash pad upper mounting bracket including: a base which is installed at a lower side of the crash pad; and a mounting portion which protrudes from the base so as to press one region of the connecting duct. Accordingly, the crash pad upper mounting bracket presses the connecting duct so as to maintain airtightness between the HVAC and the connecting duct, thereby preventing deterioration in air conditioning performance.

4 Claims, 4 Drawing Sheets

Prior Art

Prior Art

CRASH PAD UPPER MOUNTING BRACKET

CROSS-REFERENCE TO RELATED APPLICATIONS

This application claims priority to and the benefit of Korean Patent Application No. 10-2013-0086633 filed in the Korean Intellectual Property Office on Jul. 23, 2013, the entire contents of which are incorporated herein by reference.

TECHNICAL FIELD

The present invention relates to a crash pad upper mounting bracket for mounting an air conditioning unit for a vehicle, and more particularly, to a crash pad upper mounting bracket which has a rib and a mounting portion so as to press a connecting duct such that an air leak is prevented from occurring at a portion where the connecting duct is coupled to a heating, ventilating, and air conditioning system (hereinafter, referred to as an HVAC).

BACKGROUND ART

In the case of a vehicle such as a passenger vehicle, a crash pad is formed at a front side of a driver, and an HVAC including a heater is mounted at a front side of the crash pad. A dash panel is positioned at a front side of the HVAC so as to form a boundary with an engine room.

As the related art associated with the aforementioned configuration, Korean Patent No. 10-0633410 discloses 'Structure for Mounting Air Conditioning Unit for Vehicle'.

Referring to FIG. 1, in a structure for mounting an air conditioning unit for a vehicle, a guide boss 50 is provided in order to resolve a problem in that an HVAC 10 sags from a cowl cross member due to HVAC's own weight during a process of mounting a crash member module 2.

That is, in the structure for mounting the air conditioning unit for a vehicle, in order to prevent the HVAC from sagging due to HVAC's own weight in a state in which the HVAC is assembled to the cowl cross member, the guide boss 50, which protrudes toward an upper portion of the HVAC 10 at a predetermined length, is coupled at a front side of a defrost duct 22. Accordingly, the structure for mounting the air conditioning unit for a vehicle is characterized in that the HVAC 10 is prevented from sagging due to HVAC's own weight.

However, when the crash member module 2 is mounted, in an assembly direction illustrated in FIG. 2, to the cowl cross member 30 to which the HVAC 10 is mounted, the HVAC 10 to which a connecting duct 70 is coupled receives rotational force, as illustrated by an arrow of FIG. 2. Therefore, an amount of protrusion of the guide boss 50 is insufficient, and the connecting duct 70 is lifted up.

The connecting duct 70 is made of polyethylene (PE), and has a thickness of about 1.0 to 1.2 T by continuously reducing a weight. Therefore, the connecting duct 70 itself has low rigidity, and thus may be deformed.

That is, an outlet of the HVAC and an inlet of the connecting duct need to be tightly fitted with each other so that air flows and is transferred without an air leak, but there are problems in that because the connecting duct 70 is deformed, and an upper portion of the crash pad sags, the connecting duct 70 is lifted up, and as a result, an air leak and noise occur.

SUMMARY OF THE INVENTION

The present invention has been made in an effort to provide a crash pad upper mounting bracket which fixes a connecting duct so as to prevent the connecting duct from being lifted up due to deformation of the connecting duct, and presses one region of the connecting duct so as to prevent an air leak and noise from occurring.

An exemplary embodiment of the present invention provides a crash pad upper mounting bracket which is installed between an HVAC (heating, ventilation and air conditioning) to which a connecting duct of a vehicle is connected, and a crash pad, the crash pad upper mounting bracket including: a base which is installed at a lower side of the crash pad; and a mounting portion which protrudes from the base so as to press one region of the connecting duct.

One side of the connecting duct may be pressed by the mounting portion, and the other side may be pressed by the base, in a direction in which an inlet of the connecting duct is coupled to an outlet of the HVAC, such that coupling between the inlet of the connecting duct and the outlet of the HVAC maintains airtightness.

The mounting portion may press one side of the inlet of the connecting duct so as to prevent the inlet of the connecting duct from being lifted up from the outlet of the HVAC.

The mounting portion may press an inlet of the connecting duct using pressing force formed by a weight of the crash pad.

The crash pad upper mounting bracket may further include a rib which protrudes from one side of the base toward the connecting duct, is coupled to a side surface of the connecting duct, and supports the connecting duct.

The crash pad upper mounting bracket according to the exemplary embodiment of the present invention, which has the aforementioned configuration, presses the connecting duct so as to maintain airtightness between the HVAC and the connecting duct, thereby preventing deterioration in air conditioning performance.

Since airtightness is maintained, noise due to an air leak may also be removed.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
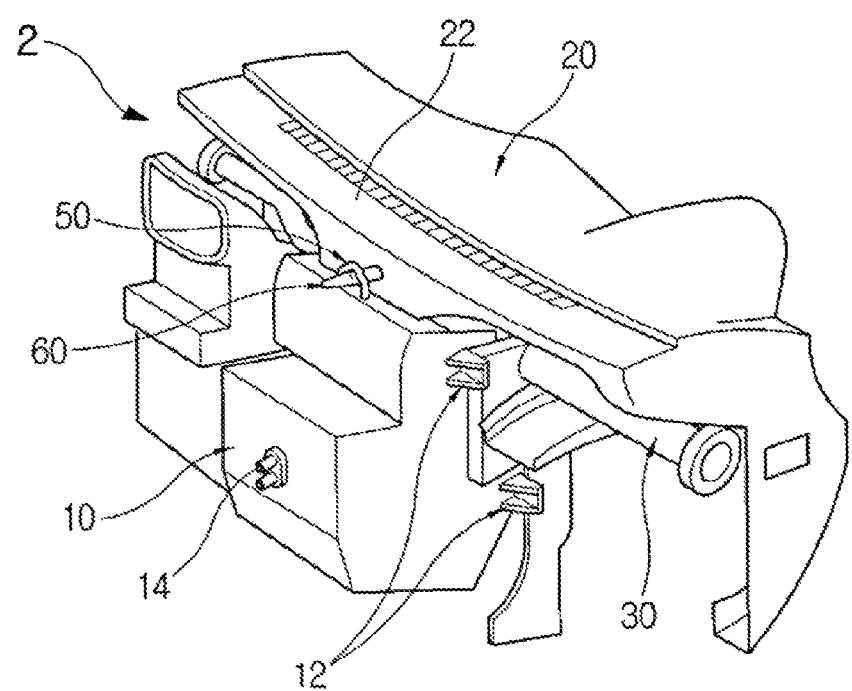
FIG. 1 is a view illustrating a structure for mounting an air conditioning unit for a vehicle in the related art.
Figure 2:
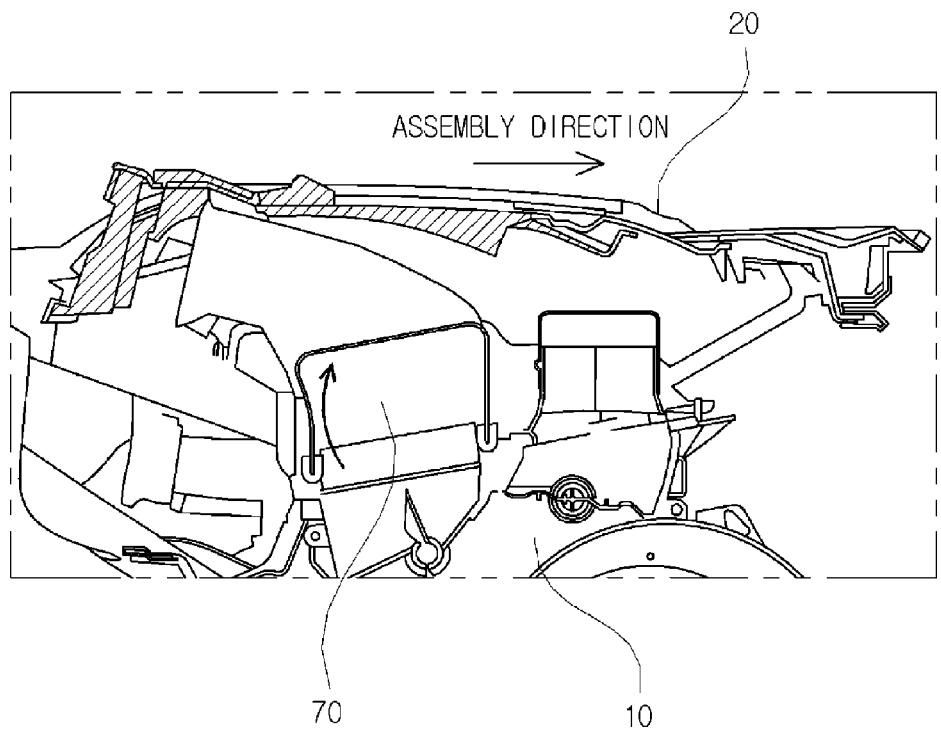
FIG. 2 is a view illustrating a state in which a crash pad upper mounting bracket in the related art is installed in a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter, exemplary embodiments of the present invention will be described in detail with reference to the accompanying drawings in order to clarify a method of solving the technical problems of the present invention. However, in the description of the present invention, descriptions of publicly-known related technologies incorporated herein will be omitted when it is determined that the descriptions of the publicly-known related technologies may obscure the subject matter of the present invention. Parts indicated by like reference numerals (reference numbers) refer to like elements throughout the specification.

Hereinafter, a crash pad upper mounting bracket 1 according to an exemplary embodiment of the present invention will be described.

Figure 3:
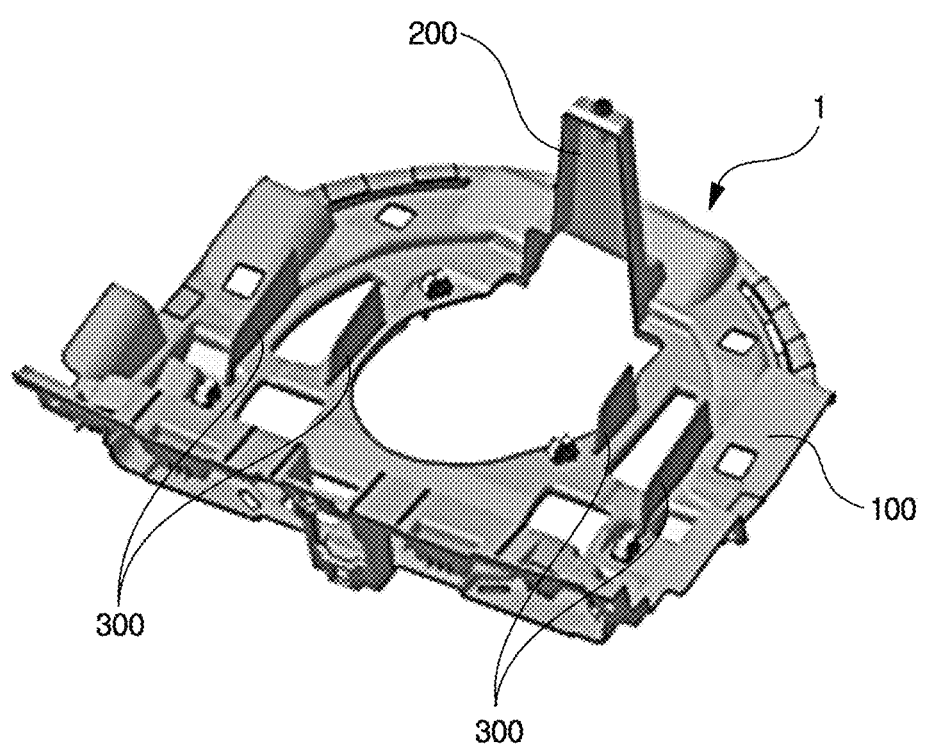
FIG. 3 is a perspective view illustrating a crash pad upper mounting bracket according to an exemplary embodiment of the present invention.
Figure 4:
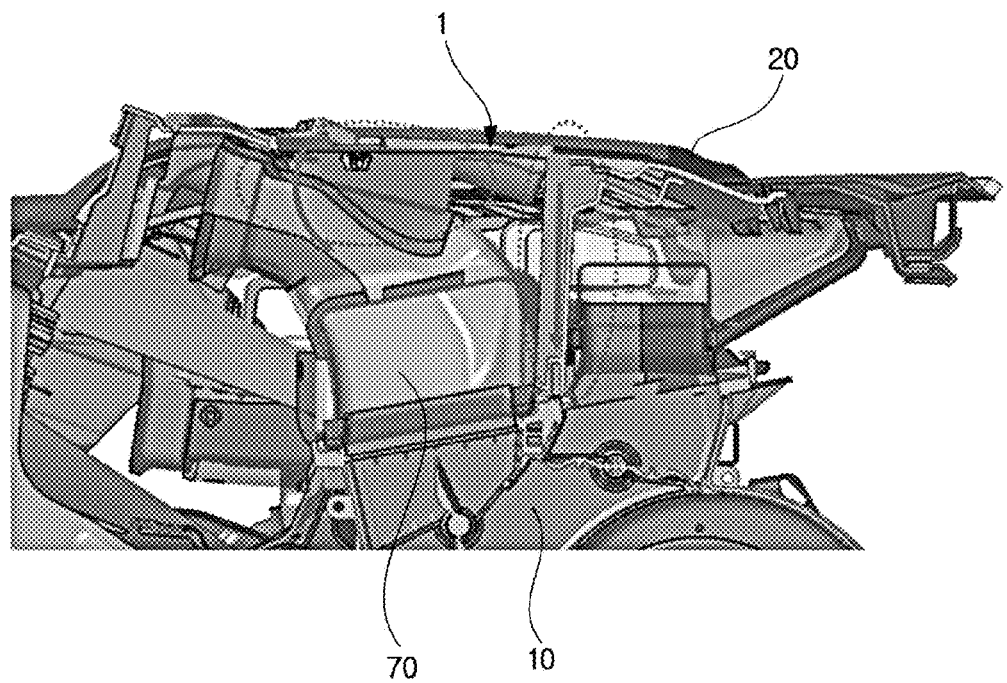
FIG. 4 is a view illustrating a state in which the crash pad upper mounting bracket according to the exemplary embodiment of the present invention is installed.

Referring to FIGS. 3 and 4, the crash pad upper mounting bracket 1 according to the exemplary embodiment of the present invention is installed between an HVAC (heating, ventilation and air conditioning) 10 to which a connecting duct 70 of a vehicle is connected, and a crash pad 20.

Here, the HVAC 10 performs heat exchange by allowing air, which flows into an intake unit by a blower unit including a blower motor, to selectively pass through an evaporator core through which a refrigerant flows, or a heater core through which a coolant cooling an engine flows. After the heat exchange, cool air or warm air is supplied to a passenger compartment through a vent for ventilation so as to cool or heat the passenger compartment, and make the passenger compartment fresh.

The crash pad upper mounting bracket 1 may include a base 100, a mounting portion 200, and at least one rib 300.

The base 100 is formed in a plate shape that is installed between the HVAC 10 and the crash pad 20, and an upper portion of the base 100 is coupled to a lower portion of the crash pad 20.

As illustrated in FIG. 4, the mounting portion 200 protrudes from the base 100 so as to press one region of the connecting duct 70. More particularly, the mounting portion 200 presses one side of an inlet of the connecting duct 70 so as to prevent the inlet of the connecting duct 70 from being lifted up from an outlet of the HVAC 10.

Collectively, one side of the connecting duct 70 is pressed by the mounting portion 200, and the other side thereof is pressed by the base 100. That is, the crash pad upper mounting bracket 1 presses the connecting duct 70 at two points in a direction in which the inlet of the connecting duct 70 is coupled to the outlet of the HVAC 10, thereby maintaining airtightness between the HVAC 10 and the connecting duct 70.

Meanwhile, in a case in which the base 100 and the mounting portion 200 press the connecting duct 70, the connecting duct 70 may be pressed by a weight of the crash pad upper mounting bracket 1, but because the base 100 of the crash pad upper mounting bracket 1 supports the crash pad 20, the connecting duct 70 is also pressed by a weight of the crash pad 20 in addition to the weight of the crash pad upper mounting bracket 1.

Therefore, the base 100 and the mounting portion 200 may press the connecting duct 70 so as to maintain airtightness between the outlet of the HVAC 10 and the inlet of the connecting duct 70 regardless of whether or not the connecting duct 70 and peripheral components are deformed.

As illustrated in FIGS. 3 and 4, the rib 300 protrudes from the base 100 so as to press one region of the connecting duct 70. For example, as illustrated in FIG. 3, the pair of ribs 300 protrudes toward the connecting duct 70, is coupled to side surfaces of the connecting duct 70, and supports the connecting duct 70. Therefore, since the ribs 300 are coupled to the connecting duct 70, the one region of the base 100, which is in contact with the connecting duct 70, consistently presses only the one region of the connecting duct 70.

Therefore, the connecting duct 70, which has a thickness of 1.0 to 1.2 T and is made of PE, has low rigidity, but since the connecting duct 70 is supported by the ribs 300, the connecting duct 70 is not deformed by an external condition such as heat. Accordingly, the inlet of the connecting duct 70 is prevented from being lifted up from the outlet of the HVAC 10.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A combination of a crash pad upper mounting bracket which is installed between an HVAC (heating, ventilation and air conditioning), to which a connecting duct of a vehicle is connected, and a crash pad, the crash pad upper mounting bracket comprising:
a base which is installed at a lower side of the crash pad; and
a mounting portion which protrudes from the base so as to press one region of the connecting duct,
wherein one side of the connecting duct is pressed by the mounting portion, and the other side is pressed by the base, in a direction in which an inlet of the connecting duct is coupled to an outlet of the HVAC, such that coupling between the inlet of the connecting duct and the outlet of the HVAC maintains airtightness.

2. The combination of claim 1, wherein the mounting portion presses one side of the inlet of the connecting duct so as to prevent the inlet of the connecting duct from being lifted up from the outlet of the HVAC.

3. The combination of claim 1, wherein the mounting portion presses an inlet of the connecting duct using pressing force formed by a weight of the crash pad.

4. The combination of claim 1, further comprising:
a rib which protrudes from one side of the base toward the connecting duct, is coupled to a side surface of the connecting duct, and supports the connecting duct.

* * * * *